June 21, 1955   R. D. CONWELL   2,711,124
COUNTER BALANCE PLOW
Filed Oct. 9, 1952   2 Sheets-Sheet 1
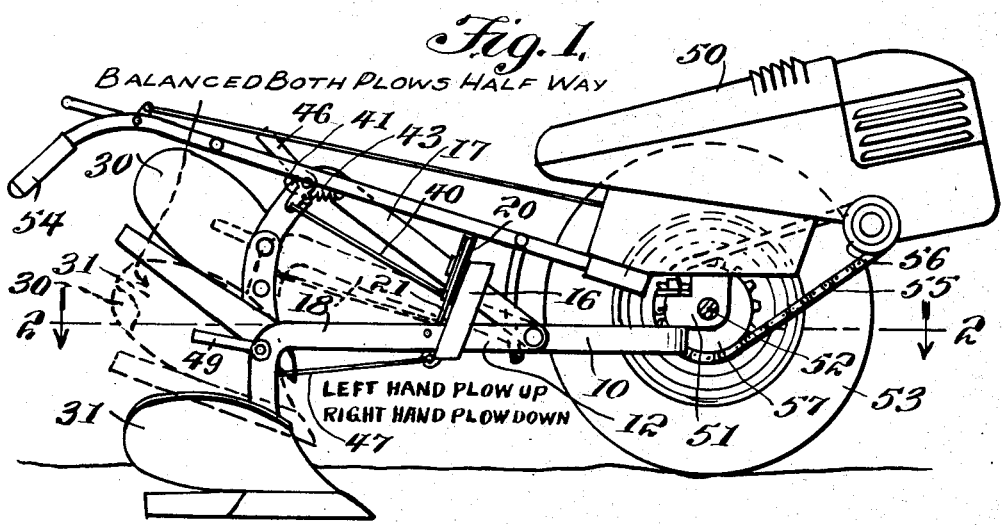
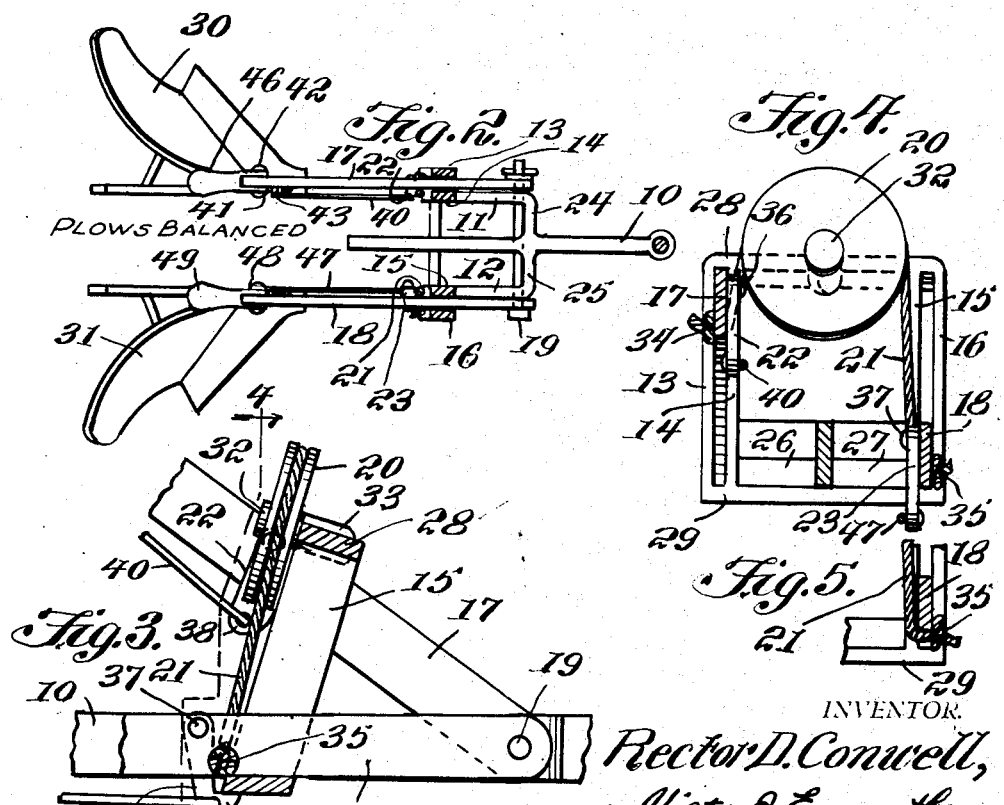
INVENTOR.
Rector D. Conwell,
Victor J. Evans
ATTORNEYS

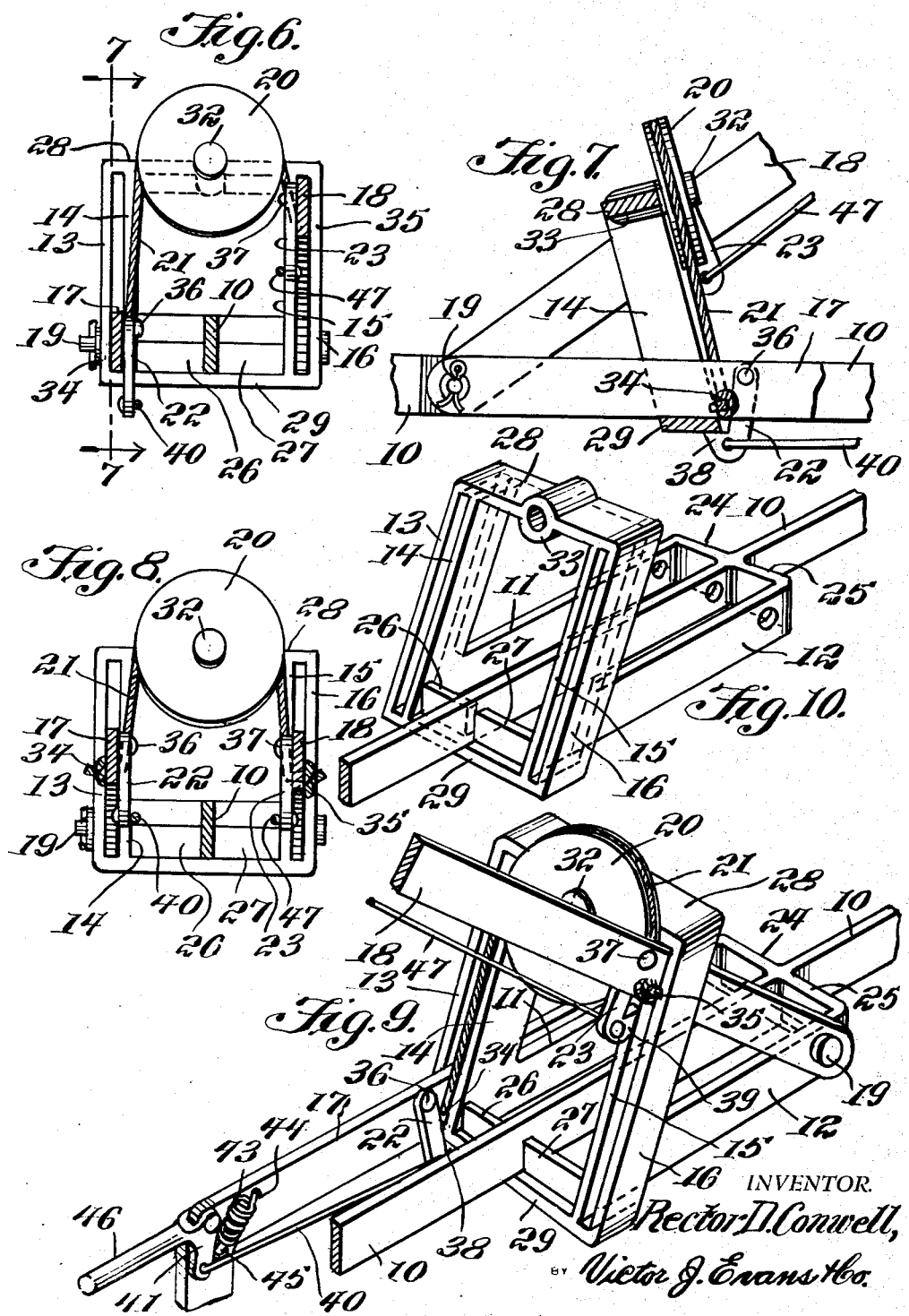

United States Patent Office 2,711,124
Patented June 21, 1955

2,711,124

COUNTERBALANCE PLOW

Rector D. Conwell, Mount Clare, W. Va.

Application October 9, 1952, Serial No. 313,967

1 Claim. (Cl. 97—29)

This invention relates to tractor drawn plows of the double type wherein a plow on one side is used for plowing across a field in one direction and in the return trip the plow on the opposite side is used, and in particular this invention includes a frame having spaced yokes through which plow beams extend with a pulley on the frame over which cables connected to the plow beams are trained, the cables being positioned whereby the downward movement of one plow elevates the plow on the other side, and locking latches for holding the plows, selectively in downwardly disposed plowing positions.

The purpose of this invention is to provide a plow mounting frame wherein a pair of plows mounted in the frame may be alternately elevated and lowered to plowing positions and whereby one plow is suspended in an elevated position by the weight of the other plow.

Various types of devices have been provided for mounting double plows used in plowing straight across the field instead of plowing around the field, however, it is difficult to reverse the position of a plow, and when two plows are used means must be provided for retaining one plow in an elevated position. With this thought in mind this invention contemplates a counterbalancing mounting wherein with two oppositely disposed plows carried by the mounting one plow provides a counterweight for the other and a single operator may readily shift the positions of the plows.

The object of this invention is, therefore, to provide means for mounting a plurality of plows in a frame whereby one plow provides a counterweight for the other and whereby each plow may readily be shifted to an operative position.

Another object of the invention is to provide a mounting for a plurality of plows wherein each plow may be locked in an operative position.

A further object of the invention is to provide a frame for mounting a plurality of plows with one plow providing a counterweight for another in which the frame is of a simple and economical construction.

With these and other objects and advantages in view the invention embodies a chassis having a tongue extended from one end with spaced vertically disposed yokes through which plow arms extend, with a pulley journaled at the upper end of the yoke and having a cable thereon the ends of which are attached to the plow arms, and latches for locking the plow arms with the plows in operative positions.

Other features and advantages of the invention will appear from the following description taken in connection with the drawings, wherein:

Figure 1 is a side elevational view illustrating the counterbalance dual plows attached to a conventional tractor with one plow in an elevated position and with another in the operative position and with the plows shown in dotted lines in a neutral or intermediate position.

Figure 2 is a plan view of the attachment with parts of the yokes broken away and shown in section, said section being taken on line 2—2 of Fig. 1.

Figure 3 is a longitudinal section through the chassis showing one plow arm extended upwardly and with the plow arms and ends of the chassis broken away.

Figure 4 is a cross section through the chassis taken on line 4—4 of Fig. 3.

Figure 5 is a detail illustrating a connection of one of the plow arms to a cable extended over the equalizing pulley.

Figure 6 is a cross section, similar to that shown in Fig. 4 showing the position of the plow arms reversed.

Figure 7 is a longitudinal section taken on line 7—7 of Fig. 6 showing one of the plow arms in the downward or operative position and the other in an upwardly extended position and showing the device with the ends of the plow arms and chassis broken away.

Figure 8 is a cross section through the device also taken substantially on line 4—4 of Fig. 3 and in which both of the plow arms are in neutral positions wherein the plows are suspended above the ground.

Figure 9 is a perspective view illustrating the chassis with one arm in the downward or operative position and the other in an upwardly extended position.

Figure 10 is a perspective view illustrating the construction of the chassis, showing the yokes extended upwardly and with parts omitted and other parts broken away.

Referring now to the drawings wherein like reference characters denote corresponding parts the counterbalance dual plow of this invention includes a chassis having a longitudinally disposed tongue 10 with side bars 11 and 12 and with upwardly extended yokes formed with spaced bars 13 and 14 at one side and 15 and 16 at the other, plow arms 17 and 18 extended through the yokes and pivotally mounted by a pin 19 to the forward end of the chassis, a pulley 20, a cable 21, and latches 22 and 23 for retaining the plows in operative positions.

The side bars 11 and 12 of the chassis are connected to the tongue 10 with end sections 24 and 25, at one end, bars 26 and 27 at the opposite end and plates 28 and 29 which also connect the upper and lower ends of the yokes.

A plow 30 is carried by the extended end of the plow arm 17 and an oppositely positioned plow 31 is carried by the extended end of the plow arm 18.

The pulley 20 is journaled by a pin 32 in a socket 33 in the upper cross bar 28, connecting the upper ends of the yokes and the cable 21 is positioned with one end attached to the plow arm 17 at the point 34 and with the opposite end attached to the plow arm 18 at the point 35.

With the length of the cable accurately determined one of the plows is extended upwardly when the other plow is being used and with the cable equally divided the plow arms 17 and 18 are positioned midway between the lower and upper positions, as shown in Fig. 8 whereby both of the plows are suspended above the ground.

The latches 22 and 23 are pivotally mounted by pins 36 and 37, respectively on the plow arms 17 and 18 and, as illustrated in Fig. 9, jaws 38 and 39 of the latches extend below the plate 29 to lock the plow beams with the plows in operative positions, the jaw 38 of the latch 22 being shown below the edge of the plate 29.

The latch 22 is connected by a rod 40 to a lever 41 which is pivotally mounted by a pin 42 on the plow beam 17 and the lever is held with the latch in the holding position, as shown in Fig. 9 by a spring 43, one end of which is secured to the beam 17 by a loop 44, and the opposite end to the latch 41 through an eye 45. The lever 41 is provided with a handle 46 and by drawing the lever upwardly by hand the latch 22 is actuated, against the spring 43 to release the plow beam 17.

The latch 23 is connected in a similar manner with a rod 47 to a lever 48 that is pivotally mounted on the plow beam 18 and the lever 48 is provided with a handle 49, similar to the handle 46.

The length of the cable 21 is such that the downward movement of one plow beam draws the plow beam on the opposite side upwardly and with one plow beam in an intermediate or neutral position, the other plow beam is held in a similar position on the opposite side.

With the parts arranged in this manner a conventional tractor, as indicated by the numeral 50 is mounted on the chassis and the tongue 10 of the chassis pivotally connected to a bracket 51 on an axle 52 on which wheels of the tractor are positioned. The tractor may be provided with wheels 53 and handles 54 and the axle with the wheels thereon may be driven by a chain 55 through sprockets 56 and 57.

By this means a plow on one side of the device may be lowered to an operative position in the ground with the weight thereof drawing the plow on the opposite side upwardly and when a turn is made at the end of a row the plow extended upwardly is drawn downwardly whereby the weight thereof draws the other plow upwardly so that the positions of the plows are changed to correspond with the direction of travel of the plow. The plows are adapted to be suspended in neutral positions in transporting the device to and from a field.

It will be understood that modifications, within the scope of the appended claim, may be made in the design and arrangement of the parts without departing from the spirit of the invention.

What is claimed is:

A dual plow mounting frame comprising a chassis having a longitudinally disposed tongue, side bars parallel to said tongue on opposite sides thereof, short sections connecting the one of the ends of said side bars to said tongue in spaced relation thereto, a first pair of upwardly extending bars having their lower ends integral with the opposite ends of said side bars, short bars connecting the lower ends of said upwardly extending bars to said longitudinally disposed tongue in spaced relation thereto, a second pair of upwardly extending bars positioned outwardly of said first pair of upwardly extending bars in spaced parallel relation thereto, a first cross plate having a socket centrally thereof connecting the upper ends of said first and second pairs of upwardly extending bars, a second cross plate connecting the lower ends of said first and second pairs of upwardly extending bars, plows having beams positioned with the forward ends of the beams pivotally mounted on the side bars at one end thereof and with the beams extended rearwardly through the first and second pairs of upwardly extending bars, a pin positioned in the socket in said first cross plate, a pulley journalled on the pin intermediate of said first and second upwardly extending bars, a cable trained over said pulley and positioned with the ends thereof connected to said plow beams respectively, a latch pivotally mounted on each plow beam, each latch adapted to selectively coact with said second cross plate to retain one plow in plowing position while the other plow is in an elevated position and means for attaching the chassis to a tractor.

References Cited in the file of this patent
UNITED STATES PATENTS

| | | |
|---|---|---|
| 361,830 | Marx et al. | Apr. 26, 1887 |
| 520,281 | Willard | May 22, 1894 |
| 801,711 | Collins | Oct. 10, 1905 |
| 1,363,755 | Reynolds | Dec. 28, 1920 |
| 2,424,192 | Rogers et al. | July 15, 1947 |
| 2,555,555 | Olson et al. | June 5, 1951 |

FOREIGN PATENTS

| | | |
|---|---|---|
| 163,961 | Great Britain | June 2, 1921 |
| 226,175 | Switzerland | June 16, 1943 |